3,487,027
ACIDIC CURING AGENTS FOR ORGANIC POLYEPOXIDES
Leslie C. Case, 14 Lockeland Road,
Winchester, Mass. 01109
No Drawing. Continuation-in-part of applications Ser. No. 301,599, Aug. 12, 1963, and Ser. No. 382,660, July 14, 1964. This application Oct. 7, 1966, Ser. No. 584,990
Int. Cl. B01j 11/32; C08g 30/12
U.S. Cl. 252—431          4 Claims

ABSTRACT OF THE DISCLOSURE

This invention relates to novel, fluid, very reactive acidic curing agents for organic polyepoxides. These acidic curing agents are prepared by heating dimer or trimer acid together with an organic derivative of titanium, iron, or chromium. These acidic curing agents provide very fast cures of epoxides without heating, and are effective even with such unreactive epoxides as epoxidized soybean oil.

---

This application is a continuation-in-part of my applications Ser. No. 301,599, filed Aug. 12, 1963, and Ser. No. 382,660, filed July 14, 1964 both now abandoned.

This invention relates to novel curable compositions and to the cured, infusible, insoluble resins obtained therefrom. More specifically, this invention relates to tough, elastic compositions comprising epoxidized soybean oil, specific activators and long-chain aliphatic acids, and to the room-temperature-cured flexible compositions produced therefrom.

Cross-linked resins derived from polyepoxides and polycarboxylic acid anhydrides have been known for many years and have found numerous uses in bonding, laminating, casting, sealing, molding and potting applications. The known polyepoxides which form useful products are relatively expensive and it would be highly advantageous to replace them with a low-cost polyepoxide, such as epoxidized soybean oil. Unfortunately, the epoxy groups in epoxidized soybean oil are extraordinarily unreactive, and require elevated temperatures and exceptionaly reactive curing agents. Thus, epoxidized soybean oil has been reported to react (U.S. Patent 3,012,007) at 150–180° C. with the exceedingly reactive anhydride 1,4,5,6,7,7-hexachlorobicyclo - (2,2,1) - 5-heptene-2,3-dicarboxylic acid anhydride to form a hard, inflexible resin. Efforts to activate ordinary curing agents to achieve reaction with epoxidized soybean oil have also been reported in the prior art (U.S. Patent 3,201,360, British Patent 903,933) but unfortunately all of the systems described require elevated temperatures to effect a cure, and frequently do not result in compositions with the properties requisite for sealants. Since it is impossible in many sealant applications to heat the system components, a room-temperature curing composition which would lead to a tough, flexible, waterproof, adherent, cured resin would be very advantageous. Room-temperature cross-linked resins which have mechanical and physical properties desirable for sealant applications and which are derived solely from epoxidized soybean oil and polycarboxylic acids and/or anhydrides of ordinary reactivity are unknown to the art.

It has now unexpectedly been discovered that cross-linked compositions based solely on the aforementioned epoxidized soybean oil and polycarboxylic acids and anhydrides of ordinary reactivity can be prepared which have excellent physical properties, making them eminently useful in sealant applications. It is an object of the present invention to produce tough, elastic, flexible, resilient, products from epoxidized soybean oil and long-chain aliphatic polycarboxylic acids. Another objective of the present invention is to provide activated fluid acidic compositions having very desirable solubility characteristics suitable for curing epoxidized soybean oil at or near room temperature. It is a still further objective of the present invention to provide room-temperature curing sealant compositions employing epoxidized soybean oil.

For purposes of the present invention, room-temperature curing compositions are compositions which cure in the absence of and do not require any external application of heat. Under ordinary circumstances, room temperatures will generally range from about 15° C. to about 30° C., and could be as high as 35° to 40° C., depending on the climate, and it is to be understood that these temperature variations are within the scope of the present invention and that the essential criterion is the lack of application of external heat.

In accordance with the objectives of the present invention, I have discovered that epoxidized soybean oil can be successfully cured at room temperature with long-chain aliphatic polycarboxylic acids in the presence of specific activation agents to very desirable, tough, elastic cross-linked compositions by the process described in my copending application Ser. No. 301,599. This process employs novel activating agents which comprise organic esters, chelates, and acylates of elements having an electronegativity value falling within the range of at least about 1.2 up to about 2.6 and which are particularly effective in promoting the cure of polyepoxides with polycarboxylic acids or anhydrides.

The epoxidized soybean oil used in the present invention is derived from naturally occurring soybean oil by epoxidation techniques known to the art and generally consists of a mixture of epoxidized triglycerides in which the average number of epoxide groups per molecule is at least three and usually not more than five, and in general is about four. However, since there may be some residual double bonds which were not epoxidized, or since some of the epoxy groups may have become hydrated or otherwise reacted, the average number of epoxy groups per molecule will not necessarily be an integer but may be a fractional value, such as, for example 3.4, 3.7, or 4.2. In addition to the epoxide groups and the ester groups present in the original triglyceride the epoxidized soybean oil may also contain small quantities of other functional groups such as hydroxyl, ether, carbonyl, and vinyl groups.

Although epoxidized soybean oil is preferred it is to be understood that other epoxidized oils which can be cured more readily than epoxidized soybean oil may be employed either in place of the soybean epoxide, or admixed therewith. Epoxidized oils which are less reactive and more difficultly curable than epoxidized soybean oil, such as the triglyceride of epoxidized oleic acid, also known as trivernolin, which is available from natural sources can be used either alone, or admixed with epoxidized soybean oil. In general, any epoxidized oil containing from 3 to less than about 5 epoxy groups can be used.

The polycarboxylic acids and anhydrides contemplated for use in the present invention comprise saturated and unsaturated aliphatic anhydrides and acids having from 6 to 54 carbons atoms. Particularly preferred and most useful are the long-chain aliphatic polycarboxylic acids having from 36 to 54 carbon atoms and their anhydrides. Mixtures of acidic curing agents may be employed. Representatives of these preferred long-chain acids are dilinoleic acid, trilinoleic acid and the commercially available aliphatic dibasic acid, known under the name of, and hereinafter and in the claims referred to as Dimer Acid, and the aliphatic tribasic acid, known under the name of, and hereinafter and in the claims referred to as Trimer Acid, and anhydrides of these acids. The commercially available Dimer Acids are produced by dimerization of unsaturated eighteen carbon atom-containing fatty acids and is generally a mixture which contains as its major constituent, generally 75 percent by weight or more of a thirty-six-carbon atom-containing long-chain aliphatic dicarboxylic acid with two or more alkyl side chains and an approximate molecular weight of 565 and an approximate equivalent weight of 283, along with smaller amounts of undimerized, monobasic $C_{18}$-fatty acid and the Trimer Acid, a trimerized fifty-four carbon atom-containing tricarboxylic acid with an approximate molecular weight of 850 and an approximate equivalent weight of 283. Generally available mixtures will have molar ratios of Dimer Acid to Trimer Acid varying from 36:1 to 6:1 and will usually contain less than 5 percent by weight of monobasic acid. Trimer Acid is prepared by polymerization of unsaturated $C_{18}$-fatty acids and is usually a mixture which contains minor amounts of the $C_{36}$ Dimer Acid as well as small amounts of the monobasic $C_{18}$ acids. Especially suitable for use in tthe present invention are mixtures containing as much as thirty percent by weight of Trimer Acid and less than ten percent and preferably less than two percent by weight of monobasic acid with the remainder being constituted of Dimer Acid. It should be understood that such mixtures containing small amounts of monobasic constituents are within the scope of the present invention and should be assumed to be present whenever long-chain aliphatic polycarboxylic acids having from 36 to 54 carbon atoms are referred to in the specification and claims describing the present invention.

Polyazelaic anhydride, azelaic acid, adipic acid, dodecenylsuccinic acid, dodecenylsuccinic anhydride, isosebacic acid, and others may also be employed, but these curing agents are not preferred since they are expensive and may present solubility problems.

The activating compounds which I have found to be very useful for the preparation of the compositions of the present invention comprise organic esters, acylates and chelates of the element titanium, in which the inorganic element is bound to the organic residue through oxygen. These organic titanium derivatives may be employed directly by admixing them at room temperature with the epoxidized soybean oil and the acidic curing agent. Alternatively, the organic titanium compound may be prereacted with the acidic curing agent as described hereinbelow to form an activated fluid curing agent. The latter mode of operation is frequently preferred.

I have further discovered that organic chelates and acylates of iron and chromium which when mixed with epoxidized soybean oil and the curing agent form a heterogeneous system, unreactive at room temperature, and which are of no use as such, for purposes of the present invention, can be converted to compositions useful in curing epoxidized soybean oil at room temperature, if they are prereacted with the long-chain aliphatic polycarboxylic acid and/or anhydride curing agents to form an activated, homogeneous, fluid curing agent. Mixtures of such acids and anhydrides may be used.

To prepare the activated homogeneous fluid curing agents which constitute the preferred embodiment of the present invention, organic metal derivatives of the group consisting of organic esters, acylates and chelates of titanium, iron, and chromium, in which the inorganic element is bound to the organic residue through oxygen, are mixed with the long-chain aliphatic polycarboxylic acids having from six, and preferably 36 to 54 carbon atoms and this mixture is heated at a temperature from about 75° C. to generally not more than 250° C., and preferably within a temperature range of 100° C. to 225° C. During this heating cycle volatile materials are observed to be evolved. In order to produce a suitable activated curing agent the reaction mixture should be heated until a clear homogeneous fluid composition is obtained, or the heating may be continued until volatiles cease to be evolved. The heating period required to produce a satisfactory activated curing agent may vary from a few minutes to generally not more than about ten hours and usually to less than about six hours and frequently to about one hour.

With organic derivatives of titanium a temperature range of about 100° C. to 200° C. and a heating period of a few minutes to about one hour will generally suffice to produce an activated curing agent suitable for use in the present invention.

When organic derivatives of iron are employed, heating periods of at least ten minutes and advisably of several hours at a temperature of about 150° C. to about 200° C. are generally used.

In order to produce satisfactory activated curing agents from organic chromium derivatives, the reaction mixture should advisably be heated for a period of 30 minutes to several hours within a temperature range of 125° C. to 225° C.

Desirable activated curing agents are prepared by heating the components in amounts such that the ratio of equivalents of organic metal derivatives to equivalents of polycarboxylic acid will range from about 0.1 to 1.0, and preferably from about 0.2 to about 0.5. The equivalent weight of the organic metal compound is computed by dividing the molecular weight of the compound by the valency of the metal. The valency value used for computation is that of the valency proper available for ionic or covalent bond formation exclusive of any coordinating valency used in chelate-type bond formation. The equivalent weight of the polycarboxylic acid is calculated by dividing the molecular weight of the acid by the number of carboxylic acid groups per molecule.

The activated acidic curing agents formed by the procedure described herein-above are homogeneous fluids readily miscible at room temperature with epoxidized soybean oil. They are of a complex and not well understood nature. They are not simple, ordinary solutions of the organic metalic compound in the long-chain aliphatic carboxylic acid, since cooling the heated reaction mixture to room temperature does not result in reprecipitation or separation of the two components but instead yields a homogenous fluid composition which exhibits considerable activity as a curing agent for epoxidized soybean oil at room temperature. According to the working hypothesis which I have formulated, but to which I do not wish to be bound, I believe that during the heating step the long-chain aliphatic carboxylic acid displaces the original organic residue from the metal compound to some extent and that the original organic derivative of the metal is thereby partially converted into the acylate of the long-chain polycarboxylic acid. This assumption is based on the weight losses incurred during the heating of titanium alcoholates and the distinct odor of acetyl acetone arising when acetylacetonates are reacted with the long-chain polycarboxylic acids. It appears, however, that this displacement is incomplete since only a fraction of the original organic residue is lost. For example, when titanium tetraisopropylate and Dimer Acid are coreacted to form an activated curing agent only about one-half of the theoretical amount of isopropyl alcohol is volatilized. Also, if the long-chain polycarboxylic acid metal acylate were the only product formed one would, because of the high concentrations and functionality of the organic metal derivatives employed, expect the activated curing agent to be a strongly gelled composition rather than the fluid compositions which are actually obtained.

For the preparation of the tough, elastic compositions of the present invention the preferred activating compounds comprise the organic esters of titanium having the general formula $Ti(OR)_4$, wherein R represents an alkyl radical having from one to 18 carbon atoms. Chelates of titanium in which the element is bound to the organic residue through oxygen are also useful. Titanium acylates and titanyl, e.g.

derivatives are also of use. Representative of very useful activating compounds are tetramethyl titanate, tetraethyl titanate, tetrapropyl titanate, tetraisopropyl titanate, tetrabutyl titanate, tetraoctyl titanate, tetrastearyl titanate, dioctylene glycol titanate, tetraallyl titanate, titanium acetylacetonate, and others.

Chromium and iron compounds useful in preparing the fluid activating curing agents of the present invention comprise organic acylates of carboxylic acids having from one to 18 carbon atoms, and chelates, in particular acetylacetonates. Examples of useful derivatives are ferric trioctoate, ferric stearate, ferric distearate, ferrous acetyl acetonate, ferric acetyl acetonate, chromic stearate, chromic oleate, chromium acetyl acetonate, and others.

Among the activated curing agents suitable for use in the present invention those based on titanium are preferred since they exhibit very good reactivity and result in cured compositions having very desirable color characteristics. Activated curing agents derived from chromium and iron organic derivatives are satisfactory for use in applications where light color is of secondary importance. Frequently the availability and cost of the organic metal derivative will primarily govern the choice of compound to be employed.

Organic titanium compounds can be used directly without prior conversion to an activated curing agent, to effect the cure of epoxidized soybean oil at room temperature whereas the organic derivatives of iron and chromium are useful only after conversion into an activated curing agent. If organic titanium derivatives are used directly there are several methods by which the cured epoxidized soybean oil compositions of the present invention may be prepared. The epoxidized soybean oil can be cured by intimately admixing the components, that is the epoxidized soybean oil, the polycarboxylic acid, or the polycarboxylic acid anhydride, and the organic titanium compound and effecting the cure by allowing the reaction mixture to stand at room temperature.

In another embodiment the epoxidized soybean oil and the polycarboxylic acid anhydride or acid may be intimately admixed prior to addition of the activating compound. This mode of operation appears particularly advantageous when solid polycarboxylic acids or anhydrides are used which are soluble in the epoxidized soybean oil to form a liquid mixture. Still another mode of operation which may be preferred in certain instances involves mixing the anhydride or acid with the activating compound and adding this combination to the epoxidized soybean oil. This procedure may be advantageously if the activating compound is a solid and the anhydride or acid is a liquid, or vice-versa.

In still another mode of operation the activating compound may be combined with the epoxidized soybean oil prior to addition of the polycarboxylic acid or anhydride. Mixtures of a polycarboxylic anhydride and a polycarboxylic acid may also be used in combination with epoxidized soybean oil and the aforementioned activating compounds.

The proportions of epoxidized soybean oil and the polycarboxylic acid or acid anhydride which are used to prepare the compositions of the present invention vary within selected limits, which may best be expressed as the ratio of the number of anhydride groups (that is,

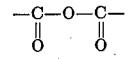

groups) or carboxylic acid groups (that is, —COOH groups) present per epoxy group (that is, per

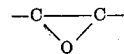

group). In general the proportions of reactants employed are such that this ratio varies from about 0.3 to about 1.0, and will preferably vary from about 0.5 to 0.7.

The amount of activating titanium compound employed generally ranges from about 0.1% to about 20% by weight of the combined weight of the epoxidized soybean oil and the polycarboxylic acid or anhydride, with the most frequently used amounts ranging from 1% to 10% by weight of the sum of the weights of the epoxidized soybean oil and the polycarboxylic acid or anhydride.

If the novel activated curing agents are employed to prepare the novel curable compositions of the present invention, the epoxidized soybean oil is simply intimately admixed at room temperature with the activated curing agent and the mixture is allowed to stand at room temperature to effect the cure.

The proportions of epoxidized soybean oil and activated curing agent which are generally employed are best expressed as the ratio of the number of

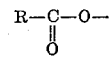

acyl radicals in the activated curing agent per epoxy group (that is, per

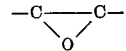

group) in the epoxidized soybean oil. The acyl radicals

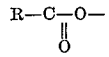

wherein R is a saturated or unsaturated aliphatic radical of from five to 53 carbon atoms and preferably of from 35 to 53 carbon atoms are residues of and derived from the aliphatic polycarboxylic acids and anhydrides used in the preparation of the activated curing agent. For most applications this ratio will vary from about 0.3 to about 1.0, and will preferably vary from about 0.5 to 0.7. Other ratios may be used as warranted.

The time required for adequate cures of the room-temperature curing system varies widely with generally at least one hour being needed and frequently 1 to 2 days of curing is required for attainment of good properties. In some instances a curing period of 1 to 2 weeks or more may be required for thorough curing of the room-temperature curing system.

Various other ingredients such as pigments, dyes, plasticizers, resins, and the like, may be admixed with the curable compositions of the present invention. Conventional reinforcing materials and fillers, such as for example, fibrous glass, aluminum powder, or asbestos may be employed. Solvents may also be used to improve fluidity and facilitate mixing, and monofunctional epoxides, or diluents may also be present.

It should be explicitly pointed out that various techniques known to the art for dealing with problems of insolubility, volatility, and stability of the reaction mixture can also be applied advantageously to the preparation of the novel compositions described and claimed herein. For example, in cases in which the reaction mixture would show an undesirably short shelf life if all of the components were combined prior to storage, the components may be segregated into two separately stable systems, which may be mixed together just prior to use.

Addition of polyols to anhydride-cured epoxy resins to give faster cures and products with improved properties is well known to the art. The same advantages of polyol addition may also be obtained in systems utilizing the novel activating systems described in this invention. Thus, it is sometimes found that the addition of a material such as a glycol, glycerol, or other polyol to a reaction mixture comprising epoxidized soybean oil, a polycarboxylic anhydride, or acid, and one of the aforementioned activating compositions leads to a faster cure, and gives a harder, more thoroughly cured product.

The compositions of the present invention are generally desirably light in color, and frequently are no darker than a physical admixture of the reactant materials. In general the compositions in the preparation of which iron or chromium derivatives were employed are somewhat darker in color than those which utilized titanium compounds. As specific examples, the room-temperature-cured sealant compositions prepared from Dimer Acid or Trimer Acid, tetraisopropyltitanate and epoxidized soybean oil generally have a color rated according to the well-known Gardner Scale of about 6 to 10, depending on the color of the Dimer or Trimer acid used as the reactant.

The compositions of the present invention are cross-linked insoluble resins characterized by considerable toughness and other good physical properties. Because of the considerable quantity of long, flexible aliphatic chains originally present in the epoxidized soybean oil which become incorporated into these compositions it is an important attribute of these compositions that they all possess a degree of flexibility which is not possessed by the cross-linked ethoxyline compositions well known to the art and based on the epichlorohydrin-bisphenol A-type epoxy resins. This intrinsic flexibility thus imparts to the compositions of the present invention a degree of toughness unusual in cross-linked ethoxyline compositions.

The cured compositions obtained when long-chain aliphatic polycarboxylic acids or anhydrides are employed are tough, flexible, resilient and elastic at room temperature or below, and in general have the characteristics of rubbers. These curable compositions are useful as sealants and adhesives, particularly since they cure at room temperature. The cured resins possess excellent adhesion and good hydrophobicity. The tough, elastic, cured compositions provided by this invention possess Shore A hardness values ranging from about 30 to more than 60.

The following examples are presented to illustrate the practice of this invention. It is to be understood, however, that these examples are for purposes of illustration only.

EXAMPLE 1

3.2 grams of epoxidized soybean oil and 0.43 gram of tetraisopropyltitanate are mixed at room temperature and to this mixture is then added 2.28 grams of commercial-grade linoleic acid dimer (Emery Dimer Acid 1024) containing about 25% linoleic acid trimer. The reaction mixture cures on standing at room temperature in 27 hours to a nearly tack-free rubber.

EXAMPLE 2

A mixture of 2.35 grams of linoleic acid dimer, and 0.45 gram of tetraisopropyltitanate is heated for 3 minutes at 150° C., and forms a clear homogeneous fluid. After cooling to room temperature, 3.5 grams of epoxidized soybean oil is stirred in. On standing at room temperature for one hour the reaction mixture has cured to a very soft rubber, and it cures to a moderately tough, strong rubber in 5 days, again at room temperature.

EXAMPLE 3

A crude, undistilled grade of tetraoleyltitanate is prepared by refluxing together tetraisopropyltitanate with a stoichiometric amount of commercial oleyl alcohol, and withdrawing the isopropyl alcohol as it is formed. Then, Example 2 is repeated, using 0.7 gram of tetraoleyltitanate in place of the tetraisopropyltitanate. The resulting product cures somewhat slower than that of Example 2, but is otherwise similar.

EXAMPLE 4

A mixture was made of 5.6 grams of epoxidized soybean oil, 4.85 grams of Dimer Acid 1024, and 0.95 gram of titanium acetyl acetonate (Tyzor AA). After standing for 27 hours at room temperature, a surface skin had formed. After standing at room temperature for 4 days the mixture had become a soft rubber.

EXAMPLE 5

A mixture was made from 5.65 grams of Dimer Acid 1024 and 0.75 gram of ferric distearate. The mixture readily formed a homogeneous solution on heating. The cooled solution was mixed with 6.85 grams of epoxidized soybean oil. The resulting clear solution had gelled on standing for 5½ hours at room temperature, and was a fairly strong rubber after standing for an additional 2 hours.

EXAMPLE 6

A mixture was made from 3.1 grams of Dimer Acid 1024 and 0.4 gram of ferric acetylacetonate. The mixture readily formed a homogeneous solution on heating. The cooled solution was then mixed with 3.55 grams of epoxidized soybean oil. The resulting clear solution had not quite gelled on standing for 12½ hours at room temperature, and had gelled on standing for 18 hours at room temperature. A fairly strong rubber resulted on standing for an additional 4 hours.

EXAMPLE 7

3.3 grams of Dimer Acid 1024 and 0.45 gram of chromic acetylacetonate were heated until a homogeneous solution was formed. The solution was then cooled to room temperature and mixed with 4.2 grams of epoxidized soybean oil. The mixture was not quite gelled after standing at room temperature for 12 hours, and had cured to a good, dark-green rubber within 17½ hours.

This example was repeated using 0.8 gram of chromic tristearate in place of the acetylacetonate. The results were very similar.

EXAMPLE 8

5.1 grams of Dimer Acid 1024 and 1.05 grams of tetraisopropyltitanate were mixed together. A gelatinous mass resulted. This mixture was then heated at 150° C. for about 15 minutes, whereupon the mixture became fluid. A weight loss of 0.4 gram during the heating was observed. The mixture was then cooled to room temperature and mixed with 7.20 grams of epoxidized soybean oil EPO. After standing for a period of 23 minutes at about 65° F. the mixture had become appreciably more viscous. After 3 hours and 53 minutes at room temperature the mixture had nearly gelled. The mixture had gelled before 6 hours and 23 minutes at room temperature. After 64 hours the casting was nearly tack free. After 7 days at room temperature the casting had an instantaneous Shore A hardness of about 45. After 18 days at room temperature the casting had an instantaneous Shore A hardness of 56, and a 1-minute reading on the Shore A durometer of 52.

EXAMPLE 9

5.35 grams of Dimer Acid 1024 was mixed with 0.6 gram of tetraisopropyltitanate. The resulting gelatinous mass was heated at 150° C. until fluid, and then cooled to room temperature. A weight loss of 0.15 gram was noted. The cooled mixture was then mixed with 7.8 grams of epoxidized soybean oil EPO. The mixture had increased perceptibly in viscosity in 51 minutes, and had become quite viscous after 4½ hours at room temperature of about 65–70° F. In 26 hours at room temperature the mixture had nearly gelled. The mixture had gelled before 40 hours. After 53 hours at room temperature, the casting was a soft, tacky rubber. After 18 days at room temperature, the casting had an instantaneous Shore A hardness of about 35 to 37, and the durometer needle cut into the surface to some extent.

EXAMPLE 10

Example 2 was repeated, using 4.5 grams of trivernolin (glycerol tris-epoxyoleate) in place of the 3.5 grams of epoxidized soybean oil. The cure took about twice as long, and the cured product was softer and more flexible than that of Example 2.

EXAMPLE 11

Example 5 was repeated, using 9.1 grams of trivernolin in place of the 6.85 grams of epoxidized soybean oil. The cure was slower, and the product was somewhat softer than that of Example 5.

I claim:
1. A fluid, homogeneous epoxy curing agent prepared by heating in intimate admixture at a temperature of from about 75° C. to about 250° C. for a period of time sufficient to produce a fluid homogeneous composition (1) an acidic compound selected from the group consisting of aliphatic hydrocarbon polycarboxylic acids having from 36 to 54 carbon atoms and anhydrides thereof with (2) an organic derivative of a metal selected from the group consisting of titanium, iron, and chromium, said derivative being selected from the group consisting of organic esters of alcohols having not more than 18 carbon atoms, acylates of aliphatic hydrocarbon monocarboxylic acids having from one to 18 carbon atoms, and acetylacetonates, with the ratio of equivalents of (2) to (1) employed varying from 0.1 to about 1.0.
2. The composition of claim 1 in which said (2) is an organic titanium compound selected from the group consisting of acetylacetonate and titanates of the formula $Ti(OR)_4$ wherein R is an alkyl radical having not more than 18 carbon atoms.
3. The composition of claim 1 in which said (2) is an organic chromium compound selected from the group consisting of acetylacetonate and acylates of aliphatic hydrocarbon monocarboxylic acids having from one to 18 carbon atoms.
4. The composition of claim 1 in which said (2) is an organic iron compound selected from the group consisting of acetylacetonates and acylates of aliphatic hydrocarbon monocarboxylic acids having from one to 18 carbon atoms.

References Cited

UNITED STATES PATENTS

| | | |
|---|---|---|
| 3,012,007 | 12/1961 | Caflisch et al. |
| 3,242,145 | 3/1966 | Martin. |
| 3,385,835 | 5/1968 | Kugler et al. |

PATRICK P. GARVIN, Primary Examiner

U.S. Cl. X.R.

260—2, 18